(12) United States Patent
Bielke et al.

(10) Patent No.: US 10,683,142 B2
(45) Date of Patent: *Jun. 16, 2020

(54) PLASTIC BAG ZIPPER CLOSURE WITH SEALING PROJECTIONS

(71) Applicant: Inteplast Group Corporation, Livingston, NJ (US)

(72) Inventors: Garth Bielke, New Braunfels, TX (US); Natee Tasadoug, Chonburi (TH)

(73) Assignee: Inteplast Group Corporation, Livingston, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,083

(22) Filed: Mar. 29, 2019

(65) Prior Publication Data

US 2019/0225383 A1    Jul. 25, 2019

Related U.S. Application Data

(63) Continuation of application No. 15/476,457, filed on Mar. 31, 2017, now Pat. No. 10,287,064.

(51) Int. Cl.

| | |
|---|---|
| *B65D 33/25* | (2006.01) |
| *B29C 65/08* | (2006.01) |
| *B29C 65/58* | (2006.01) |
| *B29C 65/72* | (2006.01) |
| *B29C 65/82* | (2006.01) |
| *B29C 65/00* | (2006.01) |
| *B29C 65/02* | (2006.01) |
| *B29L 31/00* | (2006.01) |
| *B29L 5/00* | (2006.01) |

(52) U.S. Cl.
CPC .......... *B65D 33/2591* (2013.01); *B29C 65/02* (2013.01); *B29C 65/08* (2013.01); *B29C 65/58* (2013.01); *B29C 65/72* (2013.01); *B29C 65/8253* (2013.01); *B29C 66/1122* (2013.01); *B29C 66/12421* (2013.01); *B29C 66/21* (2013.01); *B29C 66/3452* (2013.01); *B29C 66/43* (2013.01); *B29C 66/474* (2013.01); *B29C 66/524* (2013.01); *B29C 66/73921* (2013.01); *B29C 66/8511* (2013.01); *B29C 66/71* (2013.01); *B29C 66/919* (2013.01); *B29C 66/949* (2013.01); *B29L 2005/00* (2013.01); *B29L 2031/7128* (2013.01)

(58) Field of Classification Search
CPC ................ B65D 33/25; B65D 33/2508; B65D 33/2516; B65D 33/2525; B65D 33/2533; B65D 33/2541; B65D 33/255; B65D 33/2558; B65D 33/2566; B65D 33/2575; B65D 33/2583; B65D 33/2591
USPC ............................................. 383/61.1, 63–65
See application file for complete search history.

(56) References Cited

U.S. PATENT DOCUMENTS

| | | |
|---|---|---|
| 3,808,649 A | 5/1974 | Ausnit |
| 4,929,487 A | 5/1990 | Tilman et al. |
| 5,192,135 A | 3/1993 | Woods et al. |

(Continued)

FOREIGN PATENT DOCUMENTS

EP    0114373 A2    8/1984

*Primary Examiner* — Jes F Pascua
*Assistant Examiner* — Nina K Attel
(74) *Attorney, Agent, or Firm* — Stinson LLP

(57) ABSTRACT

A plastic bag comprising a welded segment at its closure which comprises sealing projections and interlocking projections to form a high integrity seal at the closure edges.

15 Claims, 8 Drawing Sheets

(56) References Cited

U.S. PATENT DOCUMENTS

| | | | |
|---|---|---|---|
| 5,366,294 | A | 11/1994 | Wirth et al. |
| 5,558,439 | A | 9/1996 | Tilman |
| 5,689,866 | A | 11/1997 | Kasai et al. |
| 6,030,122 | A | 2/2000 | Ramsey et al. |
| 6,033,113 | A * | 3/2000 | Anderson .......... B65D 33/2541 24/585.12 |
| 6,217,216 | B1 | 4/2001 | Taheri |
| 6,594,872 | B2 | 7/2003 | Cisek |
| 7,731,646 | B2 | 6/2010 | Leighton |
| 2004/0001651 | A1 | 1/2004 | Pawloski |
| 2005/0025395 | A1* | 2/2005 | Howell ................ B65B 9/093 383/61.2 |
| 2006/0111226 | A1* | 5/2006 | Anzini ............... B65D 33/2508 493/214 |
| 2011/0283488 | A1 | 11/2011 | Anzini et al. |
| 2014/0157727 | A1 | 6/2014 | Perrell et al. |
| 2014/0331835 | A1 | 11/2014 | Kosub et al. |
| 2015/0203250 | A1 | 7/2015 | Denis et al. |

\* cited by examiner

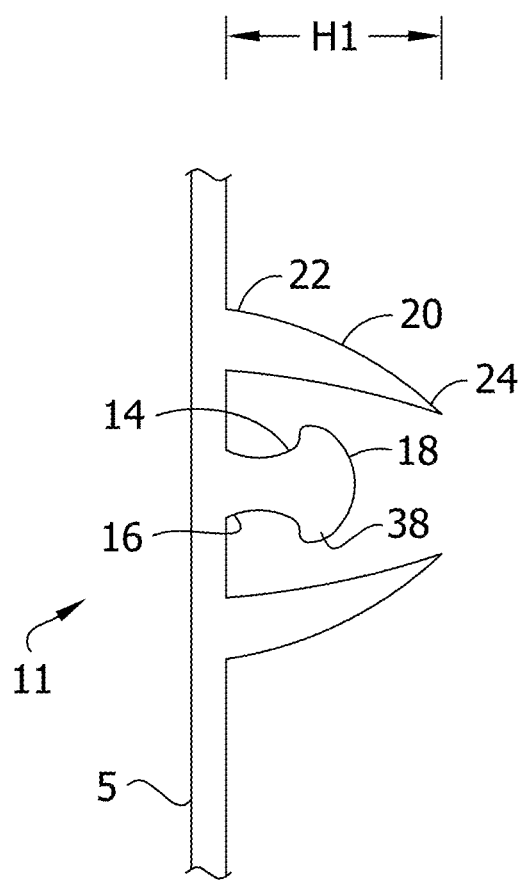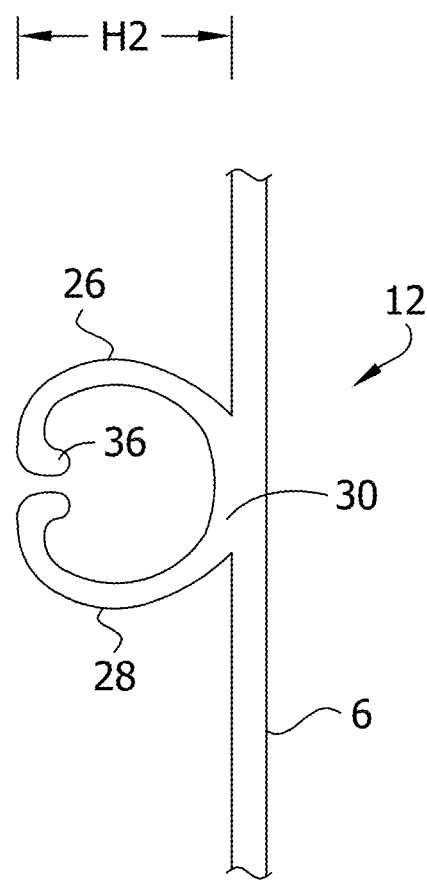

PLASTIC BAG ZIPPER CLOSURE WITH SEALING PROJECTIONS

REFERENCE TO RELATED APPLICATION

This is a continuation of application Ser. No. 15/476,457, filed Mar. 31, 2017, the entire disclosure of which is incorporated herein by reference.

FIELD OF THE INVENTION

The present invention relates to plastic bags for storage such as food and other storage bags having a zipper-type closure.

BACKGROUND

Plastic storage bags having zipper-type closures are known in the art and generally provide adequate closing function; but there is a risk of leaking where the far left side of the zipper and the far right side of the zipper intersect the left and right side edges of the bag. One approach to address these leaking concerns has been to ultrasonically weld the zipper profiles prior to heat welding for side sealing of the overall edge. This approach is based on a thinking that the heat welding alone used for the side sealing has insufficient sealing capacity to seal the zipper profiles, which are much thicker than the side walls away from the zipper profiles. The ultrasonic welding of the zipper profiles at the bag edges involves pressing the profiles together and vibrating with ultrasonic energy. The resulting vibration friction generates heat which melts the plastic so that it welds together. There is a continued desire and need to improve on this and other designs.

SUMMARY OF THE INVENTION

It is therefore an object of this invention to provide a plastic bag with a zipper-type closure which can hold liquid and does not tend to leak where the zipper profiles intersect the side edges.

Briefly, therefore, the invention is directed to a plastic bag comprising: a first panel; a second panel, the first panel and second panel defining a bag interior and an opening at a top end margin of the first and second panels to permit access to the bag interior; the first panel and second panels being sealed to each other along a bottom edge remote from and parallel to the top end margin, and being sealed to each other along a left edge and a right edge which are opposite from and parallel to each other and perpendicular to the bottom edge; and a resealable closure at the opening comprising mutually interlocking profiles on the first and second panels, respectively, the interlocking profiles comprising: a male profile on the first panel and a female profile on the second panel directly opposite the male profile; the male profile comprising an interlocking projection for engaging the female profile, wherein the interlocking projection extends perpendicularly from the first panel; the female profile comprising a channel for receiving the interlocking projection of the male profile, wherein the channel is arcuate in cross section and comprises a base section attached to the second panel and two female profile arcuate arms which extend away from the base and define the arcuate channel; and sealing projections on the first panel adjacent to and on each side of the male interlocking projection; wherein the sealing projections taper from a thicker cross section at a sealing projection base section attached to the first panel to a tip at an end remote from the sealing projection base section; wherein the sealing projections are curved inwardly toward the base of the female profile where the female profile projects from the second panel; and wherein at least the tips of the sealing projections are welded to the female profile arcuate arms and to the second panel at the sealed left and right edges of the panel.

The invention is also directed to a method for forming a plastic bag comprising welding a segment of the male profile to an end segment of the female profile of the aforementioned bag wherein said welding forms a welded segment at left and right edges of the closure.

Other objects and features will be in part apparent and in part pointed out hereinafter.

BRIEF DESCRIPTION OF THE DRAWINGS

FIG. 2 is a schematic elevation of a male closure profile being appended to the bag;

FIG. 3 is a schematic elevation of a female closure profile being appended to the bag;

Corresponding features are given corresponding reference numerals throughout the drawings.

DETAILED DESCRIPTION OF PREFERRED EMBODIMENTS

Figure 1:
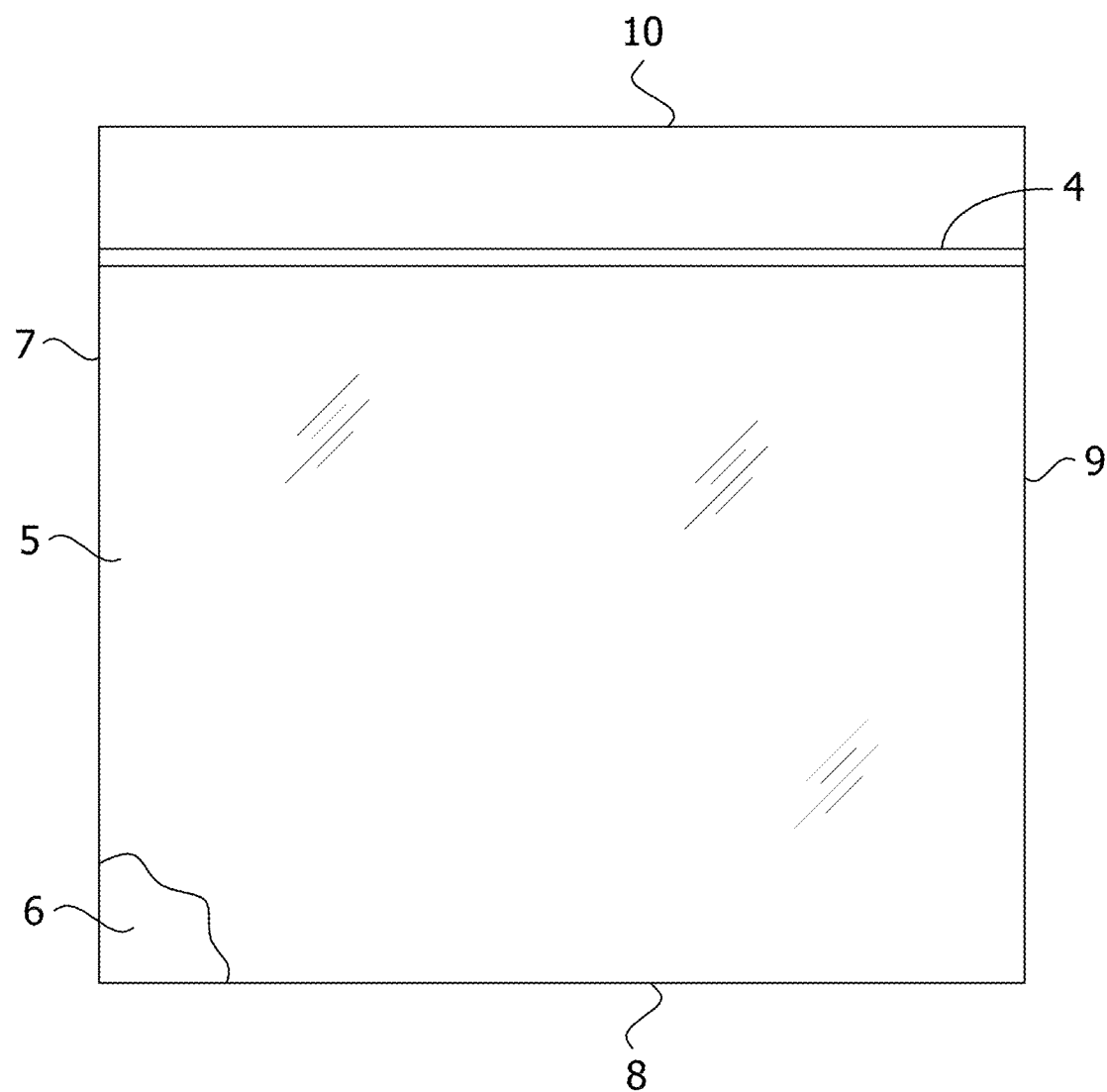
FIG. 1 is a schematic fragmentary elevation of a bag.

The invention is directed to a plastic bag which comprises two abutting flat panels having an opening at one edge and sealed along other edges, such as two rectangular panels sealed along three edges with an opening at the fourth edge. In one preferred embodiment, there is a first panel and a second panel, wherein the first panel and second panel define a bag interior and an opening at an end margin of the first and second panels to permit access to the bag interior. These are shown in the front view in FIG. 1 as two rectangular panels 5, 6, sealed along three edges 7 with an opening at the fourth edge 10. For purpose of illustration only, the lower left corner of first panel 5 is shown removed in phantom so that second panel 6 is visible. There is a zipper-type closure 4 shown schematically at the opening.

Figure 4:
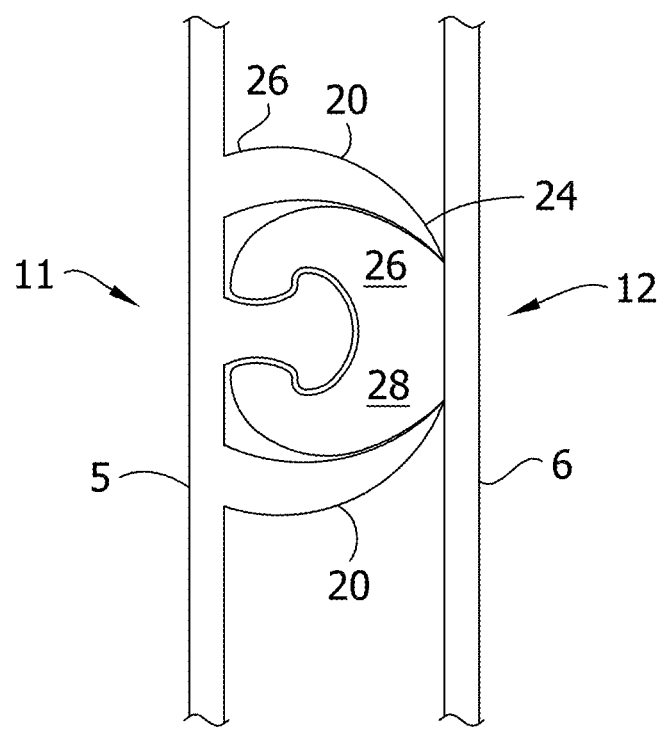
FIG. 4 is a schematic elevation showing the closure profiles pressed together.

In one preferred embodiment, the closure 4 comprises first and second mutually interlocking profiles designated 11 and 12 in FIGS. 2-4, which is an end view of the closure showing the closure in cross section. These are appended to the first and second panels 5 and 6, respectively. The interlocking male profile 11 projects perpendicularly from the first panel 5 and has an interlocking projection 14 which comprises a bulbous end section 18 and a base section 16 which projects out from the panel. Male profile 11 also includes sealing projections 20 on the first panel 5 adjacent to and on each side of the male interlocking projection 14.

The female profile 12 in FIG. 3 comprises two arcuate arms 26 and 28 which extend away from the base and define an arcuate channel in the space between the arms. This channel is sized and shaped receiving the interlocking projection 14 of the male profile. The arcuate arms comprise a base section attached to the second panel and have inwardly projecting shoulders 36 which grip outwardly projecting shoulders 38 under the bulbous tip of the male interlocking projection 14.

The sealing projections 20 of the male profile above and below the interlocking extension taper from a thicker cross section at a sealing projection base section 22 attached to the first panel to thinner cross section at a tip end 24 remote from the sealing projection base section 22. The sealing projections are curved inwardly over the interlocking projection 14 and toward the base 30 of the female profile where the female profile projects from the second panel. The sealing projections 20 project a distance from the first panel which is at least as great as a distance which the female profile projects from the second panel.

As can be seen in FIG. 4, as the profiles are pressed together, the tapered tips 24 of the sealing projections 20 tuck in underneath the arcuate arms of the female profile.

Figure 5:
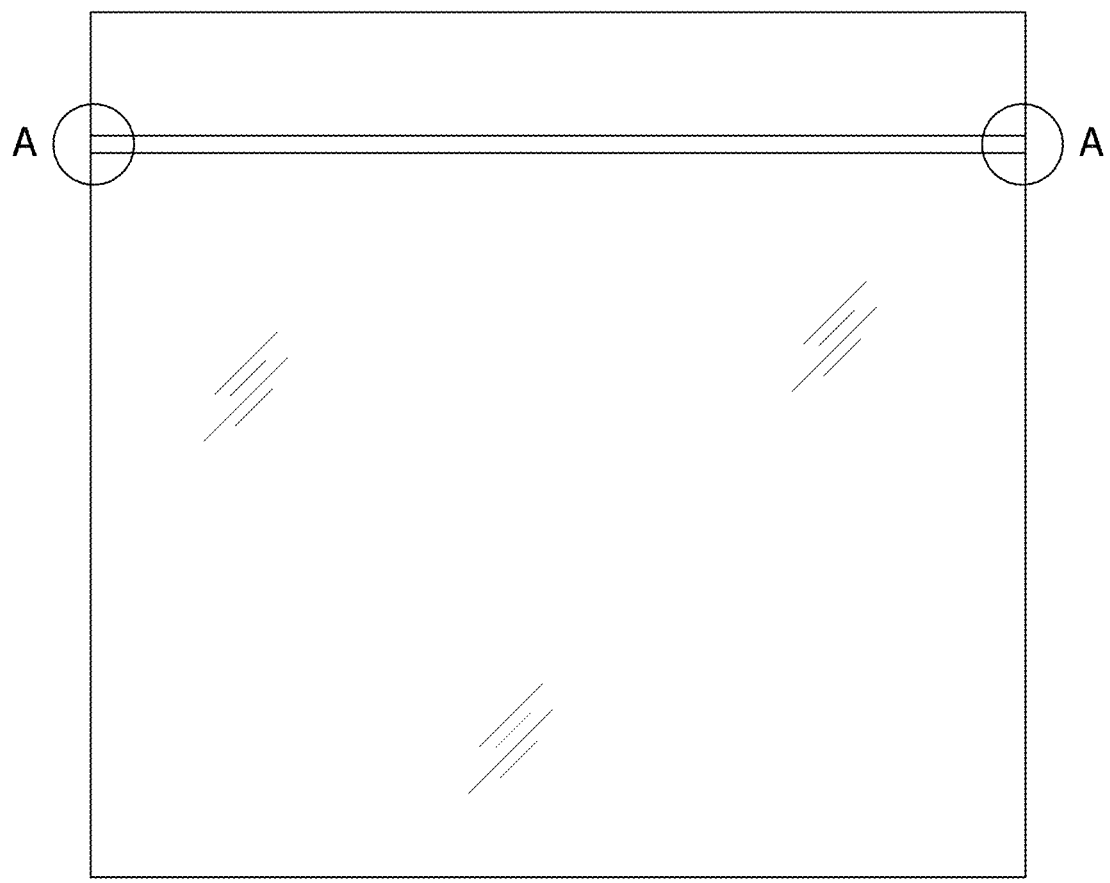
FIG. 5 is a schematic fragmentary elevation of the bag indicating edge areas encompassing closure profile segments to be welded.

Turning now to FIG. 5, there is highlighted an area marked A which encompasses a segment of the interlocking profiles which intersects the edge of the bag. In manufacturing the bag, the interlocking profiles are pressed together in this area of the bag and are welded together in a manner such that at least the tip segments 24 of the sealing projections 20 which are tucked under the arcuate arms 26/28 are partially melted such that they bond to the arms and form a liquid-tight seal at the side edge in the area A. In various embodiments, the degree of melting varies. Melting can be imparted to part or all of the sealing projections 20, as well as the arcuate arms 26/28, base 30, part or all of the interlocking projection 14, and even part of panels 5 and 6. For example, in one embodiment, the sealing projections projecting from the first panel are welded to the second panel and/or to the arcuate arms to create a seal at the left edge and right edge of the bag. The closure area at the other edge the bag opposite from side A is welded in the same manner. The sealing projections 20 project a distance from the first panel which is in one embodiment the same as a distance which the female profile as defined by the height of the arcuate arms 26/28 project from the second panel. In particular, the height $H_1$ of the sealing projections shown in FIG. 2 is the same as the height $H_2$ of the receiving channel arms shown in FIG. 3. In other embodiments, the height $H_1$ is between about 75% and 100%, such as between about 80% and 90%, of the height $H_2$. As a general proposition, in one embodiment, the height $H_1$ of the sealing projections is between about 0.035 and about 0.055 inch; the width of projection 20 at its base 22 is between about 0.006 and about 0.012 inch; the distance between sealing projection 22 and interlocking projection 14 at their bases on the panel is between about 0.02 and about 0.03 inch; the height of interlocking projection 14 is about 0.02 to about 0.04 inch; the width of the bulbous section 18 at its widest point is about 0.02 to about 0.03 inch; the height $H_2$ which the arcuate arms project out from the second panel is between about 0.04 and about 0.06 inch; the width of the female profile at its base, i.e., from the outer edge of arm 26 to the outer edge of arm 28 is between about 0.01 and about 0.02 inch; and the width of the female profile at its widest point between the outer edges of arms 26 and 28 is between about 0.04 inch and about 0.05 inch. These are the dimensions when the closure is as shown in FIGS. 2 and 3, prior to pressing and welding of the respective profiles together. Upon pressing and welding, several of the dimensions change such as the height of the sealing projections and of the arcuate arms.

Figure 6:
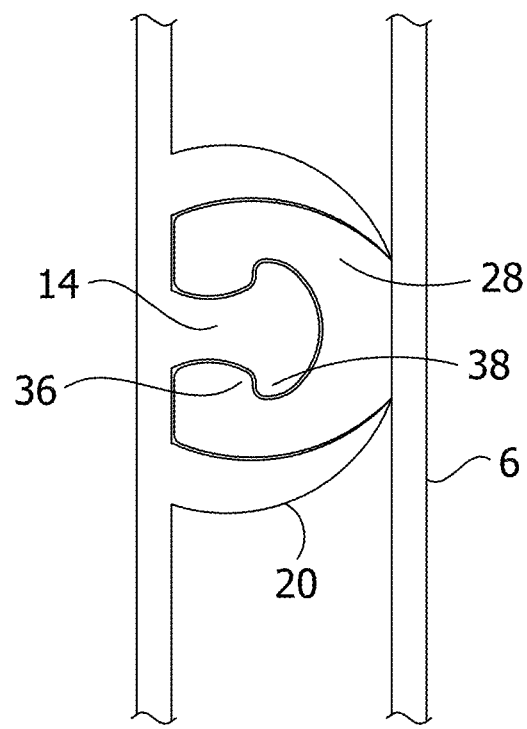
FIG. 6 is a schematic elevation showing the closure profiles welded together.

In one embodiment, the male and female profiles are joined together in area A by pressing followed by ultrasonic welding. As shown in FIG. 2, the sealing projections 20 are biased inwardly to almost overhang the interlocking projection 14. That inward bias causes the sealing projections 20 to tuck under the arcuate channel when the profiles are pressed together, as shown in FIG. 4. With the profiles pressed together as shown in FIG. 4, ultrasonic welding cis performed at the side edges A in FIG. 5. The ultrasonic welding can be performed, for example, by use of ultrasonic welding equipment available from Shantou Xinda Ultrasonic Equipment Co., Ltd. Exemplary conditions are frequency of 2 amplitude, temperature of 80-120° C., energy of 220V at 60 Hz, weld time of 15 seconds; hold time of 8 seconds, and delay of 10 seconds. After ultrasonic welding the profiles together, the three edges 7, 8, and 9 of the bag are heat welded together, which includes heat welding the profiles in the area of A, using standard conditions that are used to seal panels together in forming bag edges. FIG. 6 shows the profiles after welding, with the "rabbit ear" shaped sealing projections 20 having been melted slightly during the side sealing process and thereby melded with the arcuate arms 28 of the female zipper profile and/or bag wall 6 to further secure against leakage. The shoulders 36 on the arcuate arms 26 and 28 grip outwardly the projecting shoulders 38 under the bulbous tip of the male interlocking projection 14.

The width of the weld of the profile from the edge of the bag toward the middle of the bag is typically between about 2.5 mm and about 5.0 mm, such as between about 3 mm and about 4 mm in width.

The zipper profile material is manufactured from, for example, LDPE, LLDPE, HDPE or PP. In such embodiments, the Shore D hardness of the zipper material is greater than about 45, such as between about 45 and about 85. The bag panels 5, 6 can be made from any suitable material including typically LDPE and LLDPE, or optionally another polyolefin such as HDPE, PP, etc.

Figure 7:
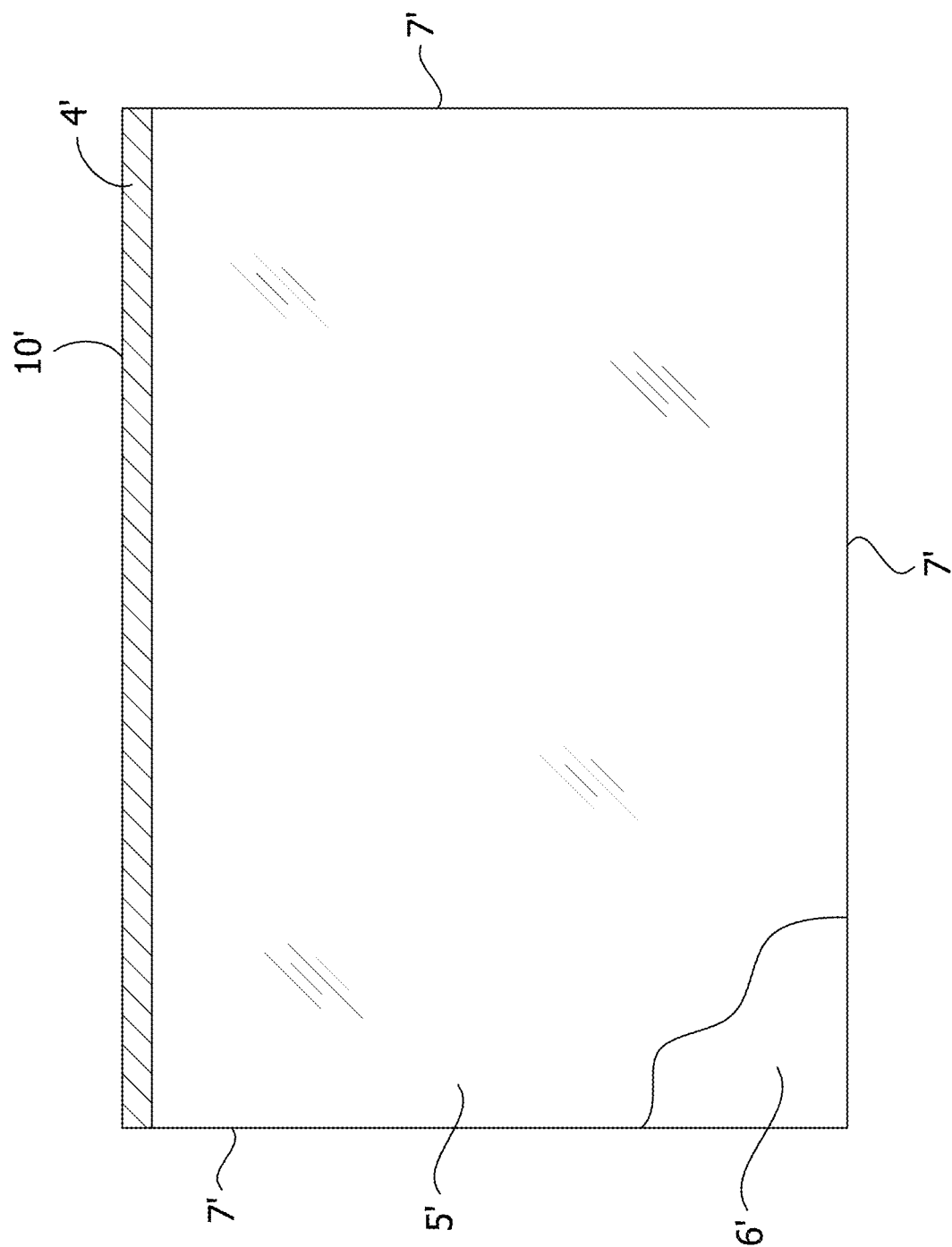
FIG. 7 is schematic fragmentary elevation of an alternative bag with the closure profile defining the top edge, and for use in connection with a slider mechanism.
Figure 8:
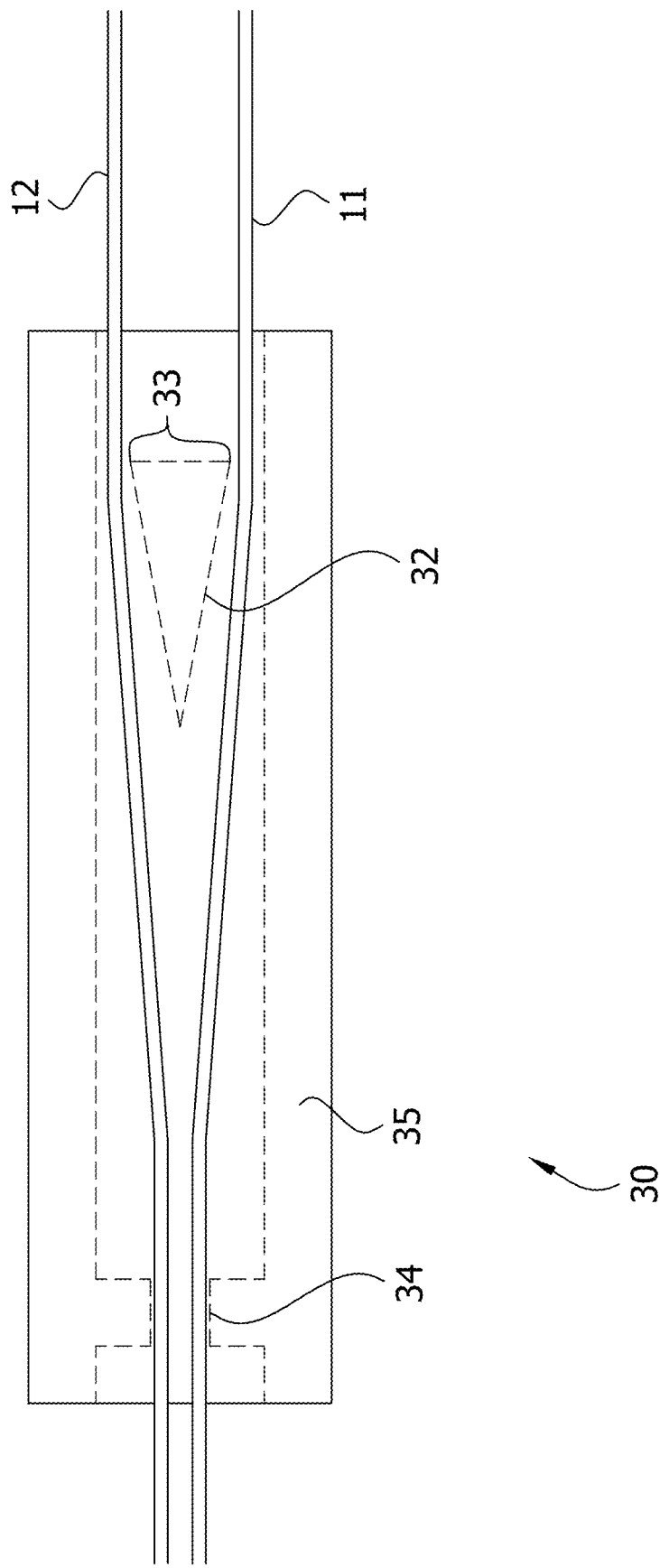
FIG. 8 is an end elevation of the slider.

In the primary embodiment shown in FIG. 1, the plastic bag of the invention is closed by the user's fingers sliding along the closure from left to right or right to left, pinching the profiles together. In an alternative embodiment, the plastic bag employs a slider such as is known from US Pub. 2016/0031609. In this slider arrangement, the closure is at the top edge opening 10' of the bag as shown at 4' in FIG. 7, with the front panel, rear panel, and side edges shown at 5', 6', and 7', respectively. The closure 4' is used in combination with a slider 30 shown in FIG. 8. As shown in the top view in FIG. 8, the slider has a separator or opener at 32 in the shape of a wedge and a constrictor or closer at 34. The top edges of the closure profiles define rails shown at 11 and 12. Walls 35 hold the slider 30 on the rails of the closure 4'. The separator 32 pushes the rails apart to unlock the closure projections to open the zipper. And moving the opposite direction, the walls 35 assist the constrictor 34 to push the closure profile closed. The slider 30 preferably has a shape, such as having differing wall lengths, that allows it to be machine-sorted and machine-aligned in the proper direction during assembly. The constriction 34 illustrated here extends inward from the walls 35 to define a narrower space than the walls for closing the closure 4'. This is one example of a newer slider configuration for illustration purposes only, and is not the only slider configuration that will work with this variation of the invention.

In forming the bags, conventional methods are used. Most typically, blown film is coextruded with zipper profiles, and the films are then aligned, sealed, and cut to form bags. Alternatively, it is possible to extrude the film and zipper profiles separately, and attach them to each other in a separate process.

EXAMPLE 1

Figure 9:
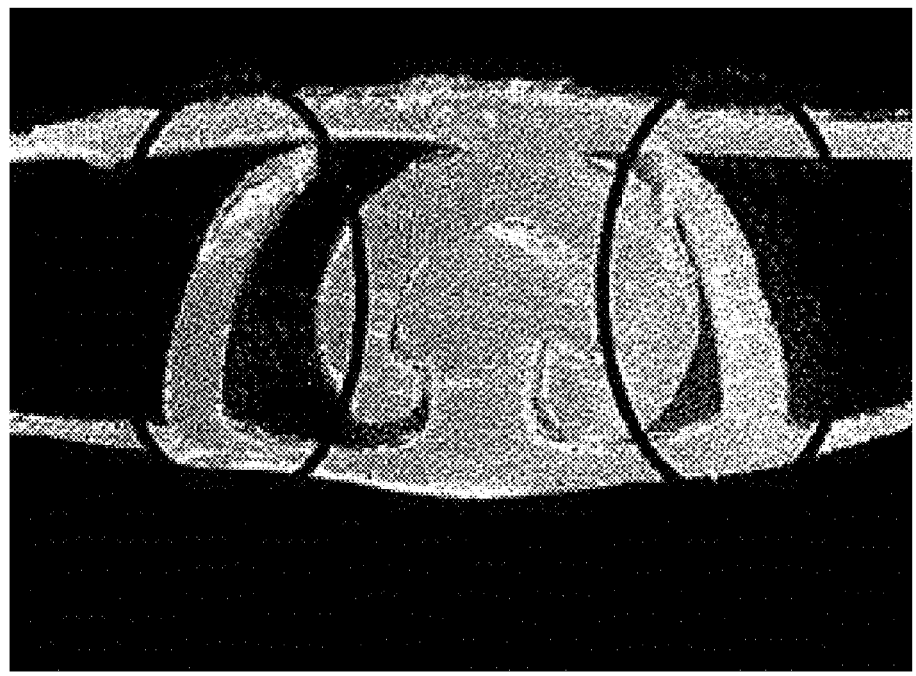
FIG. 9 is a photograph of a welded closure area of a bag according to this invention.

Blown film and zipper profiles were coextruded and mating films were aligned, sealed, and cut to form bags. All components were made from LDPE. The zipper profile components had the following dimensions, with reference to FIGS. 2 and 3: $H_1$ was about 0.043 inch; the width of projection 20 at its base 22 was about 0.009 inch; the distance between sealing projection 22 and interlocking projection 14 at their bases on the panel was about 0.024 inch; the height of interlocking projection 14 was about 0.029 inch; the width of the bulbous section 18 at its widest point was about 0.025 inch; $H_2$ was about 0.049 inch; the width of the female profile at its base, i.e., from the outer edge of arm 26 to the outer edge of arm 28 was about 0.014 inch; and the width of the female profile at its widest point between the outer edges of arms 26 and 28 was about 0.048 inch. The coextruded zipper profiles on the panels are shown in FIG. 9. The profiles were then subject to ultrasonic welding at the edges of each bag in the regions A shown in FIG. 5. The width of each welded area within region A was about 3 to 4 mm.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

The invention claimed is:

1. A plastic bag comprising:
a first panel;
a second panel, the first panel and second panel defining a bag interior and an opening at a top end margin of the first and second panels to permit access to the bag interior;
the first and second panels being sealed to each other along a bottom edge remote from and parallel to the top end margin, and being sealed to each other along a left edge and a right edge which are opposite from and parallel to each other and perpendicular to the bottom edge; and
a resealable closure at the opening comprising mutually interlocking profiles on the first and second panels, respectively, the interlocking profiles comprising:
a male profile on the first panel and a female profile on the second panel directly opposite the male profile;
the male profile comprising an interlocking projection for engaging the female profile, wherein the interlocking projection extends perpendicularly from the first panel;
the female profile comprising a channel for receiving the interlocking projection of the male profile, wherein the channel is arcuate in cross section and comprises a base section attached to the second panel and two female profile arcuate arms which extend away from the base and define the arcuate channel; and
sealing projections on the first panel adjacent to and on each side of the male interlocking projection;
wherein the sealing projections taper from a thicker cross section at a sealing projection base section attached to the first panel to a pointed tip at an end remote from the sealing projection base section and each sealing projection is thickest at the sealing projection base section attached to the first panel and tapers to said pointed tip in a continual, gradual, and consistent manner along its entire length;
wherein the sealing projections are curved inwardly toward the base of the female profile where the female profile projects from the second panel; and
wherein at least the pointed tips of the sealing projections are welded to the female profile arcuate arms and to the second panel at the sealed left and right edges of the first panel and the second panel.

2. The plastic bag of claim 1 wherein the sealing projections at their pointed tips welded to the female profile arcuate arms and to the second panel are tucked under outer surfaces of the female profile arcuate arms when the male and female profiles are pressed together.

3. The plastic bag of claim 2 wherein said pointed tips are welded along a width of between about 2.5 mm and about 5.0 mm from the sealed left edge of the first and second panel toward a middle of the bag and from the sealed right edge of the first and second panel toward the middle of the bag.

4. The plastic bag of claim 2 wherein said pointed tips are welded along a width of between about 3.0 mm and about 4.0 mm from the sealed left edge of the first and second panel toward a middle of the bag and from the sealed right edge of the first and second panel toward the middle of the bag.

5. The plastic bag of claim 1 wherein said pointed tips being welded comprises being ultrasonic welded.

6. The plastic bag of claim 5 wherein said pointed tips are welded along a width of between about 2.5 mm and about 5.0 mm from the sealed left edge of the first and second panel toward a middle of the bag and from the sealed right edge of the first and second panel toward the middle of the bag.

7. The plastic bag of claim 5 wherein said pointed tips are welded along a width of between about 3.0 mm and about 4.0 mm from the sealed left edge of the first and second panel toward a middle of the bag and from the sealed right edge of the first and second panel toward the middle of the bag.

8. The plastic bag of claim 1 wherein said pointed tips being welded comprises being heat welded.

9. The plastic bag of claim 1 wherein said pointed tips being welded comprises being ultrasonic welded and heat welded.

10. The plastic bag of claim 1 wherein said pointed tips are welded along a width of between about 2.5 mm and about 5.0 mm from the sealed left edge of the first and second panel toward a middle of the bag and from the sealed right edge of the first and second panel toward the middle of the bag.

11. The plastic bag of claim 1 wherein said pointed tips are welded along a width of between about 3.0 mm and about 4.0 mm from the sealed left edge of the first and second panel toward a middle of the bag and from the sealed right edge of the first and second panel toward the middle of the bag.

12. A method for forming a plastic bag comprising:
welding a segment of a male profile to an end segment of a female profile;
wherein the bag comprises:
a first panel;
a second panel, the first and second panels defining a bag interior and an opening at a top end margin of the first and second panels to permit access to the bag interior;
the first and second panels being sealed to each other along bottom edge remote from and parallel to the top end margin, and being sealed to each other along a left edge and a right edge which are opposite from and parallel to each other and perpendicular to the bottom edge; and
a resealable closure at the opening comprising mutually interlocking profiles on the first and second panels, respectively, the interlocking profiles comprising:
said male profile on the first panel and said female profile on the second panel directly opposite the male profile;
the male profile comprising an interlocking projection for engaging the female profile, wherein the interlocking projection extends perpendicularly from the first panel;
the female profile comprising a channel for receiving the interlocking projection of the male profile, wherein the channel is arcuate in cross section and comprises a base section attached to the second panel and two arcuate arms which extend away from the base and define the arcuate channel; and
sealing projections on the first panel adjacent to and on each side of the male interlocking projection;
wherein the sealing projections taper from a thicker cross section at a sealing projection base section attached to the first panel to a thinner cross section at a pointed tip at an end remote from the sealing projection base section and each sealing projection is thickest at the sealing projection base section attached to the first panel and tapers to said pointed tip in a continual, gradual, and consistent manner along its entire length;
wherein the sealing projections are curved inwardly toward the base of the female profile where the female profile projects from the second panel;
wherein said welding forms a welded segment at left and right edges of the closure, which welded segment includes at least the pointed tips of the sealing projections welded to the female profile arcuate arms and to the second panel.

13. The method of claim 12 wherein the welding is performed by ultrasonic welding.

14. The method of claim 12 wherein the welding is performed by heat welding.

15. The method of claim 12 wherein the welded segment has a width between about 2.5 mm and about 5.0 mm.

* * * * *